United States Patent
Tethal et al.

(10) Patent No.: US 12,504,715 B2
(45) Date of Patent: Dec. 23, 2025

(54) DISPLAY PANEL

(71) Applicant: IQ Structures S.R.O., Husinec-Rez (CZ)

(72) Inventors: Tomas Tethal, Husinec-Rez (CZ); Milan Matejka, Brno (CZ); Vladimir Kolarik, Brno (CZ)

(73) Assignee: IQ Structures S.R.O., Husinec-Rez (CZ)

( * ) Notice: Subject to any disclaimer, the term of this patent is extended or adjusted under 35 U.S.C. 154(b) by 126 days.

(21) Appl. No.: 17/904,123

(22) PCT Filed: Feb. 11, 2021

(86) PCT No.: PCT/EP2021/053281
§ 371 (c)(1),
(2) Date: Aug. 12, 2022

(87) PCT Pub. No.: WO2021/160714
PCT Pub. Date: Aug. 19, 2021

(65) Prior Publication Data
US 2023/0121150 A1      Apr. 20, 2023

(30) Foreign Application Priority Data
Feb. 14, 2020   (GB) ..................................... 2002040

(51) Int. Cl.
*G03H 1/20*      (2006.01)
*G03H 1/00*      (2006.01)
(Continued)

(52) U.S. Cl.
CPC ........... *G03H 1/024* (2013.01); *G03H 1/0005* (2013.01); *G03H 2001/0212* (2013.01);
(Continued)

(58) Field of Classification Search
None
See application file for complete search history.

(56) References Cited

U.S. PATENT DOCUMENTS

2006/0279822 A1 * 12/2006 Kmeta .................... G03H 1/02
2011/0149018 A1   6/2011 Kroll et al.
(Continued)

FOREIGN PATENT DOCUMENTS

GB       2481339       12/2011
JP       S62-63983      3/1987
WO    WO 2019/102183    5/2019

OTHER PUBLICATIONS

International Searching Authority: International Search Report and Written Opinion, Intl. App. No. PCT/EP2021/053281 (Jun. 7, 2021).

(Continued)

*Primary Examiner* — Samuel D Fereja
(74) *Attorney, Agent, or Firm* — Walters & Wasylyna LLC

(57) ABSTRACT

A display panel (1) comprising a body of optical material, the body having at least one optical image recorded therein in an encoded manner, wherein the image is selectively reconstructable and viewable (5, 6, 7) by illuminating the panel (1) using at least one light source (3a, 3b, 3c) under selected illumination conditions, wherein the image is reconstructable and viewable (5, 6, 7) such that at least one first optical property or parameter of the reconstructed image (e.g. its geometry, position in space, colour, its dynamic appearance) is selectable in value from amongst variable values of the at least one first optical property or parameter, or whose value is actively modifiable over time, as a function of or in dependence on the value of at least one second optical property or parameter of the illumination conditions of the at least one light source (e.g. its/their (Continued)

position(s) or spacing(s) relative to the panel (1), its/their colour, brightness/optical intensity, polarisation, direction of light ray propagation, application of a scanning technique to illuminate the panel (1)) which is selectable from amongst variable values thereof or which is actively modifiable in value over time.

19 Claims, 6 Drawing Sheets

(51) Int. Cl.
*G03H 1/02* (2006.01)
*G03H 1/04* (2006.01)
*G03H 1/08* (2006.01)
*G03H 1/22* (2006.01)

(52) U.S. Cl.
CPC .............. *G03H 2001/0428* (2013.01); *G03H 2001/0883* (2013.01); *G03H 2001/2292* (2013.01); *G03H 2210/62* (2013.01); *G03H 2240/20* (2013.01)

(56) References Cited

U.S. PATENT DOCUMENTS

| | | |
|---|---|---|
| 2013/0170006 A1 | 7/2013 | Kurashige et al. |
| 2021/0389724 A1* | 12/2021 | Cossairt ............... G03H 1/2286 |
| 2022/0043396 A1* | 2/2022 | An ....................... G03H 1/0866 |

OTHER PUBLICATIONS

Intellectual Property Office: Search Report, App. No. GB2002040.0 (Aug. 10, 2020).

* cited by examiner

DISPLAY PANEL

PRIORITY

This application is the U.S. national phase entry of Intl. App. No. PCT/EP2021/053281 filed on Feb. 11, 2021, which claims priority from GB2002040.0 filed on Feb. 14, 2020. The entire contents of PCT/EP2021/053281 and GB2002040.0 are incorporated herein by reference.

TECHNICAL FIELD

This invention relates to a display panel, more particularly (though not exclusively) to a display panel in which at least one optical image, especially a three-dimensional image, is recorded in an encoded manner in the panel and is selectively reconstructable by illuminating the panel using at least one light source under particular selected illumination conditions. The invention also relates to an optical arrangement comprising such a display panel, and to a method of forming or reconstructing one or more optical images, especially one or more three-dimensional optical images, from such a display panel using particular selected illumination conditions provided by one or more light sources.

BACKGROUND AND PRIOR ART

The kind of display panel with which the invention is concerned may sometimes be referred to as a "cryptographic" display panel, meaning that the or each recorded optical image that is for reconstruction from the panel is encoded therein in such a way that the or each image is not visible to a viewer when the panel is present in, or illuminated under, general ambient lighting conditions, but the or each image is or becomes visible, upon its/their reconstruction, to a viewer only when the panel is illuminated under particular specified illumination conditions.

Nowadays it is usual for imaging techniques to employ either projection techniques—in which an image is reconstructed on various surfaces of either a reflective kind (e.g. a cinema projection screen) or a transmission visualization type (e.g. a virtual water wall)—or imaging using electronic displays (e.g. LED television), or even a combination of both of these. For the reconstruction of 3D images using such known techniques it is generally necessary to utilise special 3D devices (such as 3D glasses, polarizing glasses, colour filters, etc) in order to achieve 3D rendering of the image. Alternatively, the display may be designed to be only seemingly spatial and a 3D effect created in another way (e.g. through reflecting mirrors assembled into a 4-sided pyramid and projecting 4 synchronous images with a single display at the centre of the pyramid tip).

When using holography for imaging, displays with a holographic surface are used to direct light, and in combination with projection techniques a true 3D image can be created or the image can itself be directly holographic. In such cases the hologram may be static (e.g. like a standard hologram image) or it may be dynamic—e.g. by use of a specific device that changes the image's structure with time so as to produce direct holographic 3D animation. However, such devices are expensive, they are limited in the optical parameters they can work with, and they are not currently available for use with conventional displays.

The present invention seeks to address the shortcomings of the known art and to provide a system which enables the production or reconstruction of visual images, especially 3D images, from a "cryptographic"-type display panel in a simpler yet more versatile manner, and which avoids the need for using special auxiliary devices to view such images.

SUMMARY OF THE INVENTION

Accordingly, in a first aspect the present invention provides a display panel comprising a body of optical material, the body having at least one optical image recorded therein in an encoded manner, wherein the image is selectively reconstructable and viewable by illuminating the panel using at least one light source under selected illumination conditions, wherein the image is reconstructable and viewable such that at least one first optical property or parameter of the reconstructed image is selectable in value from amongst variable values of the at least one first optical property or parameter, or whose value is actively modifiable over time, as a function of or in dependence on the value of at least one second optical property or parameter of the illumination conditions of the at least one light source which is selectable from amongst variable values thereof or which is actively modifiable in value over time.

In a second aspect the present invention provides an optical arrangement for the reconstruction and viewing of at least one optical image, the arrangement comprising:
a display panel comprising a body of optical material and having at least one optical image recorded therein in an encoded manner; and
at least one light source;
wherein the value of at least one second optical property or parameter of the illumination conditions of the at least one light source is selectable from amongst variable values thereof or is actively modifiable in value over time,
and the image is selectively reconstructable and viewable by illuminating the panel using the at least one light source such that at least one first optical property or parameter of the reconstructed image is selectable in value from amongst variable values of the at least one first optical property or parameter, or whose value is actively modifiable over time, as a function of or in dependence on the said selected value of the at least one second optical property or parameter of the illumination conditions of the at least one light source, or as a function of or in dependence on the at least one second optical property or parameter of the illumination conditions of the at least one light source which is actively modified in value over time.

In a third aspect the present invention provides a method of forming or reconstructing at least one optical image, especially at least one three-dimensional optical image, from a display panel using at least one light source, wherein the display panel is a display panel according to the first aspect of the invention or any embodiment thereof, the method comprising:
providing an optical arrangement comprising the said display panel and the said at least one light source;
selecting the value of the at least one second optical property or parameter of the illumination conditions of the at least one light source from amongst the variable values thereof, or actively modifying the value of the said optical property or parameter over time, and
illuminating the display panel using the so selected or actively modified at least one light source,
whereby the image is selectively reconstructed and viewable by the said illumination of the panel using the so selected or actively modified at least one second optical property or parameter of the at least one light source such that the at least one first optical property or parameter of the reconstructed image is selected in value from amongst variable values thereof, or whose value is actively modified over time, as a function of or in dependence on the said selected value of the at least one second optical property or parameter of the at least one light source, or as a function of or in dependence on the actively modified at least one second optical property or parameter of the at least one light source.

In many embodiments of the invention in its various aspects, the at least one optical image that is recorded in an encoded manner in the panel may be at least one three-dimensional optical image.

In various embodiments of the invention there may be recorded in an encoded manner in the panel and reconstructable therefrom either a single optical image, especially a single 3D optical image, or alternatively a plurality of optical images, especially a plurality of 3D optical images. In the case of a plurality of such images, in some such embodiments the individual images of the plurality, when reconstructed, may be coincident or superimposed over one another, or may be separated or spaced from one another in space, such as in different spaced-apart planes in space.

In various embodiments of the invention any one or more of the at least one optical image reconstructed from the display panel may be located, or may appear to a viewer/observer to be located, either substantially (or at least partially) within the body of optical material of the display panel, or alternatively may be located, or may appear to a viewer/observer to be located, substantially (or at least partially) outside, e.g. to a side in front of or behind, the body of optical material of the display panel.

In various practical embodiments of the invention, the first optical property or parameter of the or each reconstructed image may be selected from various optical properties or parameters of the or each image when reconstructed, or may manifest itself in various ways in the reconstructed image(s), including for instance any of the following (either singly or in any combination of two or more):
- the geometry, or visual shape or configuration, or other appearance, of the or each image;
- the geometry, or visual shape or configuration, or other appearance, of plural images when reconstructed and viewed collectively;
- the position of the or each image in space;
- the position in space (e.g. the position of one or more focal/image planes) at which the or each image is reconstructed and/or is viewable;
- the relative spatial separation or displacement, relative to one another, of plural such images, especially for example whether appearing in different spaced-apart planes or other locations in space;
- the colour of (i.e. the wavelength or frequency of the light that forms) the or each image;
- the polarisation (e.g. directional or phase) of light that forms the or each image;
- the temporal dynamic nature or appearance or configuration of the or each image, such as whether it is substantially static or whether the, or at least one of plural, image(s) changes with, or is animated over a period of, time.

Many of the above optical properties or parameters of the or each image when reconstructed may be characteristic of one or more 3D images. However, in some cases one or more of the above optical properties or parameters of the or each image when reconstructed may be characteristic of one or more 2D images.

In some of the preceding embodiments any one or more of the first optical properties or parameters of the or each reconstructed image may be selected so as to have a particular defined or specified value, especially if that first optical property or parameter is definable quantitatively. In such embodiments the or the respective reconstructed image may thus be a unique or single or static such image. However, in other of the preceding embodiments any one or more of the first optical properties or parameters of the or each reconstructed image may be selected so as to vary—and means provided to cause it, or its value, to vary—with or over time, especially if that first optical property or parameter is definable so as to be variable quantitatively or qualitatively. In such embodiment cases the or the respective reconstructed image may thus be a varying or moving or animated such image or an image whose visual appearance varies in one or more other ways (apart from its position or shape or configuration).

In various practical embodiments of the invention, the second optical property or parameter of the illumination conditions of (or provided or generated by) the at least one light source, which is selectable from amongst variable values thereof or which is actively modifiable in value over time, may be selected from various optical properties or parameters of the at least one light source, or may manifest itself in various ways in the illumination conditions effected by the at least one light source, including for instance any of the following (either singly or in any combination of two or more):
- the position of the at least one, or each, light source, especially its position relative to, or its spacing from, the display panel;
- the relative positions in space of plural such light sources, i.e. relative to each other and/or relative to the display panel, e.g. the relative positions (with respect to each other and/or to the display panel) of plural such light sources either within a given plane in space or as between different planes in space that are spaced apart from one another;
- the angle of incidence of one or more rays (or waves) of light emanating from the or each light source on the display panel as it/they interact(s) therewith;
- the colour of the or each light source, i.e. the wavelength or frequency of the light that emanates from each light source and illuminates the display panel;
- the brightness or optical intensity of the light that emanates from the or each light source;
- the polarisation (e.g. directional or phase) of the light that emanates from the or each light source;
- the direction in space (especially the direction relative to the display panel) of light rays that emanate from the or each light source, which direction may be either substantially fixed and non-variable as a function of time, or may vary as a function of time (e.g. of the nature of directional scanning by the or each light source);
- in the case of plural light sources, the relative respective directions and relative respective angles of incidence and/or brightnesses/optical intensities and/or colours and/or polarisations of light rays that emanate from respective ones of the plurality of light sources, especially in terms of the degree and/or speed by which such optical properties/parameters vary quantitatively or qualitatively as between different ones of the light sources as a collective array, series or group thereof (e.g. the degree and/or speed by which a scanning operation is effected, as shared collectively between different ones of the plural light sources).

In some of the preceding embodiments any one or more of the second optical properties or parameters of the illumination conditions of (or provided or generated by) the one or more light sources may be selected so as to have a particular defined or specified value, especially if that second optical property or parameter is definable quantitatively. In such embodiments the or the respective illumination conditions of (or provided or generated by) the or each respective light source may thus be a unique or single or non-varying such illumination condition. However, in other of the preceding embodiments any one or more of the second optical properties or parameters of the illumination conditions of (or provided or generated by) the one or more light sources may be selected so as to vary—and means provided to cause it, or its value, to vary—with or over time, especially if that second optical property or parameter is definable so as to be variable quantitatively or qualitatively. In such embodiment cases the or the respective illumination conditions of (or provided or generated by) the or each respective light source may thus be a varying or dynamic or scanning, or otherwise non-static or non-constant, such illumination condition.

Thus, in various embodiment implementations of the invention, one or more such second optical property(ies) or parameter(s) of the illumination conditions of (or provided or generated by) the one or more light sources may be selectively adopted and/or controlled and/or varied such that it/they dictate(s) or govern(s) or lead(s) to a corresponding adoption and/or control of and/or variation in or other functional relationship with, or dependence on, one or more respective one(s) of, or corresponding one(s) of, the one or more first optical property(ies) or parameter(s) of the or each optical image when reconstructed from the encoded record thereof in the display panel. In this manner, in various practical embodiment implementations of the invention, various combinations of inter-dependent or inter-operative such first and second such optical properties or parameters may desirably or suitably be selected and used in functional dependence on one another to create desired reconstructed and viewable image(s) from the display panel by the appropriate type and degree of control and/or variation of the illumination conditions provided by the one or more light sources. Thus, certain combinations of particular such first and second optical properties or parameters may in practice be preferred over other combinations thereof, depending on their precise inter-relationship and inter-dependence and the manner in which one may (or may not) affect the other. This allows for a potentially large and varied range of possible embodiment practical optical arrangements or systems that may be devised in practice, utilising the essence of the present invention in its fundamental terms.

Accordingly, in any given practical embodiment of the invention, any one or more of the above-listed first optical properties or parameters (i.e. of the or each reconstructed image) may—at least in principle—be employed in combination with any one or more of the above-listed second optical properties or parameters (i.e. of the illumination conditions of the at least one light source), and all such possible combinations and permutations are envisaged within the disclosure of the present invention in this specification.

In some of the preceding embodiments in which one or more of the second optical properties or parameters of the illumination conditions of (or provided or generated by) the one or more light sources is/are selectable from amongst variable values thereof or is/are actively modifiable or variable over time, the said one or more second optical properties or parameters of the illumination conditions may be provided or defined not only as a feature of the one or more light sources itself/themselves, but it/they may additionally or alternatively be provided or defined by a feature being or comprising one or more auxiliary optical components or auxiliary optical structures other than the one or more light sources itself/themselves, such as one or more such auxiliary optical components or auxiliary optical structures provided or located on, or proximal or adjacent to, the display panel itself or between the relevant light source(s) and the display panel, i.e. which thus contribute(s) to the overall illumination conditions of the body of optical material of the panel in or on which is recorded the one or more image(s). Such auxiliary optical components or auxiliary optical structures may include for example one or more lenses, gratings, filters (e.g. colour filters or polarising filters), waveguides, or the like. In this manner, in some embodiments of the invention it may be more appropriate to consider or define the "at least one light source" as being "at least one illumination means", which "means" may include the "at least one light source" but optionally in combination with one or more auxiliary optical components or auxiliary optical structures that contribute to the overall illumination conditions of the panel.

In many embodiments of the invention the display panel may take any suitable form, shape and configuration. In many such embodiments the panel may take the form of a substantially flat or planar plate, film, foil, strip or layer, especially one that is relatively thin in comparison with its flat surface area. The material of which the panel is composed may be substantially rigid or it may be flexible (e.g. the latter to allow it to be bent or flexed to facilitate its affixing to another, non-planar, object).

However, in other such embodiments the panel, although still of the nature of a relatively thin plate, film, foil, strip or layer, may be curved or arcuate (e.g. wavy) or otherwise non-planar in shape/configuration, especially so that it may if desired be affixed or mounted to another object.

The optical material in which the one or more optical image(s) is/are recorded in encoded form may form substantially the whole thickness or whole volume of the panel itself, in which case the one or more optical image(s) may be recorded in encoded form within the body or volume of the display panel itself. Alternatively, the optical material in which the one or more optical image(s) is/are recorded in encoded form may be provided as one or more discrete layers applied to one or more surfaces or faces of a carrier material or carrier layer, e.g. an optically non-active or transparent carrier material that does not substantially affect or detract from the optical properties of the optical material in which is recorded the one or more image(s).

In many embodiments of the invention the display panel may be of a transmission type, in which the recorded encoded optical image(s) is/are reconstructable by virtue of the light from the at least one light source passing through the display panel. In such embodiments the display panel may be substantially transparent (and optically inactive) to light other than that emanating from the at least one light source, especially to ambient light (in which case the panel may appear transparent and image-free to a casual observer).

However, in certain other embodiments of the invention the display panel may be of a reflection type, in which the recorded encoded optical image(s) is/are reconstructable by virtue of the light from the at least one light source being reflected from the display panel.

In many embodiments of the invention the one or more optical images recorded in the body of optical material of the display panel may be recorded therein in the form of any suitable optical structure that enables the or the respective image to be reconstructed by interaction with incident light. A holographic record of the or each image may be especially useful, in which case the display panel, or the body of optical material which forms part or all of the panel, may comprise a hologram. Alternatively, other types of optical structure may be used instead to record in encoded form the one or more image(s) for reconstruction by use of the display panel of the invention.

In practical implementations of the invention the one or more optical images recorded in the body of optical material of the display panel may be so recorded therein in encoded form by means of any suitable known techniques and methods for the recording of optical images in optical materials. Many such practical examples of apparatuses, techniques and method therefor, especially of holographic recording techniques, will be readily available and well within the general skill and knowledge of persons skilled in the art.

In many embodiments of the invention the light that emanates from the at least one light source for the purpose of reconstructing the at least one optical image from the display panel may be light within the visible region of the electromagnetic spectrum. In particular it may be white light, or alternatively it may be light of a selected range or band of frequencies/wavelengths. Alternatively, however, light which includes at least a portion that falls outside the visible region of the spectrum, e.g. infrared or ultraviolet light, may be used instead, if desired.

In some embodiments of the invention the at least one light source used to reconstruct the one or more optical image(s) from the display panel may comprise a single light source, e.g. a so-called "point source". In other embodiments the at least one light source used to reconstruct the one or more optical image(s) from the display panel may comprise a plurality of light sources, e.g. a plurality of "point sources". Such a plurality of light sources may be arranged or configured in any desired or appropriate array, series, grouping or pattern, e.g. depending on the overall optics of the arrangement comprising the display panel and the light sources, and the inherent optical properties (especially the above-defined first and second optical properties or parameters) of the various components of which it comprises.

The or each respective light source may for instance be a LED (e.g. a single LED), a LED panel or array (e.g. a cluster or array of a plurality of LEDs), or a laser, or a fibre-optic device, or a waveguide-based (or waveguide-containing) light source, or some other suitable light-emitting device, especially one which emits light in one or more specific directions or angular ranges or angular distributions.

In embodiments of the invention in which the second optical property or parameter of the illumination conditions of (or provided or generated by) the at least one light source is to be selected from amongst variable values thereof or which is actively to be modified in value over time, any suitable or necessary (if any) auxiliary hardware, software or other ancillary apparatus or device(s) (even optical device(s), such as one or more lenses or gratings) may be employed in order to effect or facilitate that variation, selection or active modification of that second optical property/parameter. For example, in the case of varying colour, brightness/optical intensity, polarisation or direction of ray propagation, especially in the case of any kind of scanning or cycling, suitable auxiliary hardware and e.g. computer software may be employed to effect same. Thus, such auxiliary hardware and e.g. computer software may form components of an overall optical system or arrangement according to embodiments of that aspect of the present invention.

It is a characteristic feature of many embodiments of the invention that the at least one optical image may be reconstructable and thereby viewable by a viewer or observer without the need or use or aid of a known special viewing (especially a 3D viewing) device (such as 3D glasses, polarizing glasses, colour filters, etc).

Having defined above many of the present invention's primary aspects, embodiments and features, various more specific practical embodiment implementations of the invention may be defined and summarized by way of example by the following further non-limiting discussion of such other example embodiments and various features thereof:

In one basic embodiment, a display panel comprises holographically encoded information which records an image that is visible only when the display panel is illuminated by a defined light wave (such as a light wave defined by its unique shape, angle of incidence, colour, as well as possibly other optical characteristics thereof). Observation of the image upon its reconstruction may occur on the display panel itself, which panel may be of either a transmission type (which may appear substantially transparent to an observer/viewer under general or ambient lighting conditions) or alternatively may be of a reflective type, or even it may be a combination of both types. By means of appropriate design of the "cryptogram"—that is to say, the recorded encoded image—and suitable display illumination it is possible to get 3D imaging with the possibility of animation in space. No other auxiliary viewing device (e.g. 3D glasses, etc) is required to observe such an image.

The display panel may comprise a flat plate, film, or the like, which may be substantially rigid or may be flexible. On one or both major faces of the plate, or alternatively in a plane embedded within the materials of the plate, or even in a combination of planes within and/or on one or more faces of the plate, an optical structure is provided which contains holographically (or other optically) encoded information which records at least one optical image capable of being reconstructed by the panel under the defined illumination conditions. The at least one recorded image may typically be in the form of an inscription image. The holographic (or other) optical structure may be based on optical (e.g. diffractive and/or refractive) relief, one or more silver halide layer(s), one or more dichromated gelatin (DCG) layer(s), one or more photopolymer layers, or the like.

It is a primary feature of the display panel that the encrypted information is not directly visible when looking at the display panel, but is only visible when the display is illuminated by one or more light sources under the defined conditions.

Typically, a holographic procedure for a so-called cryptogram is used for the recording of the one or more images in the optical material of the display panel. The cryptogram (i.e. the recorded encoded image(s)) is visible only once it has been reconstructed under illumination under the defined conditions—which may typically be by at least one point light source (e.g. an LED) at a defined angle of incidence on the display panel. The cryptogram may in some example embodiments be combined with another type of image recording also present in or on the panel, which other image e.g. remains visible even in the absence of the defined illumination conditions. Thus, when illuminated appropriately under the defined conditions, the display panel then displays not only the still visible (or "fixed") other image but also the "hidden" cryptographic image upon its reconstruction. In such cases the "fixed" other image may be a separate image, such as a separate image applied by printing, or another hologram, etc. Further alternatively, a given single hologram could optionally contain a "fixed" visible image as well as a hidden "cryptogram" image recorded within its optical structure.

Only one cryptographic image or alternatively a plurality of cryptographic images may be recorded in the display panel, either over an entire surface or face (e.g. a major face) thereof or in different specific locations or regions or portions thereof separate from each other, e.g. either randomly or as dictated by the geometry of the panel. Alternatively, a combination of images may be recorded at least partially overlapping with each other. There is no restriction on how images are located within the panel area, and there are no limits on how many separate "cryptogram" images or elements may be recorded in the display panel.

When the display panel is illuminated, the display panel shows either one or a plurality of images, depending on which area(s) of the display panel is/are illuminated and how it/they is/are illuminated. If there are plural recorded images at a given location within the panel and each one is visible under a different display illumination condition, then the display panel may display such plural images simultaneously if the display panel is illuminated by plural light sources at the same time.

When recording plural cryptograms in the display panel and illuminating them with light under active modification of one or more of the illumination conditions, a visible image animation may be created—which is to say, the image may develop in fullness or appearance over time, or it may actively rotate or undergo other movement, or perhaps even expansion or contraction, resizing, etc as time passes while the image is viewed/observed.

The movement of a cryptographic surface recording plural images may be perceived as linear (as in a classical film), or it may be perceived as e.g. circular, or alternatively some other defined trajectory, but it may also be random.

If the cryptographic surface recording one or more images is divided into different parts generating different images (e.g. motifs), it may be combined with, for example, a dynamic polarization filter during illuminating with the light from the light source(s), so as to effectively change the illumination conditions, thereby producing a dynamic projection—i.e. animation of an image—when one or more polarized light source(s) is/are used.

Changing the image in space can also be achieved by changing the display panel's geometry of its illumination (e.g. by changing the distance of the light source(s) from the panel or by changing the angle of illumination or angle of incidence of the light relative to the general plane of the panel), but still possibly using the same cryptogram, depending on its properties. Thus, it may be possible thereby to advantageously display an animation image only by changing the display illumination from one simple cryptogram to another, e.g. by changing the illumination angle of the panel using a matrix of point light sources (e.g. an LED array panel). If the focus of a light source in space changes, then the focus of the displayed display image may also change. The thus created animation may be 3D by use of this type of illumination of the display panel. Alternatively, one can obtain static 3D image(s), without such animation.

An example of the use of the above technique could for instance be a display panel formed into a curved shape with a curved surface, with a cryptogram recorded thereon but being reconstructed and displayed perpendicular to the display panel surface, e.g. around the body of a bottle. Thus, an image could then be created for the viewer/observer which is located inside the bottle. This is just one example of the type of visual effect that such an embodiment of the invention may provide.

In a similar way, the cryptographic display panel may change the colour of the displayed image(s). By changing the colour of the light source(s), one can change the colour of the reconstructed image(s). It may be possible to achieve the full colour of a displayed image from the display panel or even full-colour animation of an image, depending on the type of cryptogram recording the image(s). The light source(s) may emit white light. The cryptogram image(s) may however be displayed as either monochrome or full-colour image(s).

To achieve animation, it may not be necessary, by definition, to blank the light source(s). By scanning the area of the display panel using a light beam or modifying or varying with time the angle of illumination of light impinging on the panel, the display panel may be used to create animation.

As well as convention LED, laser or other light sources, one or more of the light source(s) may instead comprise a set of reflections from a static or dynamically controlled mirror or plurality of mirrors, especially for example generated by a sweeping of a laser or other light beam from its illumination source.

In certain embodiments the light source(s) may alternatively be randomly formed or distributed, for example by exploiting or creating reflections off one or more glossy surfaces of various shapes, such as those suspended in space, optionally with changing the reflection angle in e.g. an air flow. Such "randomized" light source(s) may in some such cases be dispersed in space in fluidized air, or they may fall under (or be raised against) gravity.

It is an underpinning characteristic of many embodiments of this invention that the viewing of 3D (or 2D) images reconstructed by or projected from the display panel does not require any special viewing device or glasses—they can be viewed by the naked eyes of the viewer/observer.

Typically suitable light sources include LEDs, LED panels/arrays/clusters, laser beams, light beams modified in space by multiple fibre optic outputs, as well as others.

By use of various embodiments of display panels and optical arrangements within the various aspects of the invention, it may be possible to realize various advantageous new and original design ideas and features in a practical sense that may find new and original applications in a variety of products and scenarios. For example, to name just a few possibilities:

If there are areas with alphanumeric or other graphic characters or symbols placed on the surface of the cryptogram, they can be used to create a logo, emblem, notice, price tag, etc.

An assembly of a plurality of individual display panel sections or portions may involve e.g. mechanical connection of individual puzzle pieces, each containing one or more alphanumeric characters or graphic motifs.

In the same manner, a cryptographic surface may be assembled from individual alphanumeric or other characters into, for example, a frame, such as by gluing or folding, and affixing them to a transparent surface, or by hanging the resulting assemblage in space, and suchlike.

It may also be possible to create information boards, e.g. providing dynamic 3D or 2D projection(s) observable at a given angle, which may for instance be anywhere from 0° to 360° relative to the board, or advertising space, price tags, or even technical products such as buttons, keyboards, parts of products with static or dynamic information, in-vehicle interior features (such as dashboard features), emergency exit signs on roads and motorways, other projection boards, and so on.

It may also be possible to create 3D displays viewable from any and all viewing directions (0° to 360°). For this the display panel may have a spatial shape, for example a three-sided or six-sided sleeve, etc. For spatial versions, the light source(s) may be located thereinside, the image(s) being viewable from the outside. In such displays the light source(s) may be disposed with respect to the relevant surface(s) e.g. in an axis (or coincident with a centre) of symmetry, or the like.

Within the scope of this specification it is envisaged that the various aspects, embodiments, examples, features and alternatives, and in particular the individual constructional or operational features thereof, set out in the preceding paragraphs, in the claims and/or in the following description and accompanying drawings, may be taken independently or in any combination of any number of same. For example, individual features described in connection with one particular embodiment are applicable to all embodiments, unless expressly stated otherwise or such features are incompatible.

BRIEF DESCRIPTION OF THE DRAWINGS

Various embodiments of the present invention in its various aspects will now be described in detail, by way of example only, with reference to the accompanying drawings, in which.

DETAILED DESCRIPTION OF EMBODIMENTS

FIGS. 1 to 7 show in representative schematic form only various example embodiment optical arrangements incorporating various forms of display panel, together with various forms of light source illumination means, which are in accordance with various embodiments of the invention in its various aspects.

Figure 1:
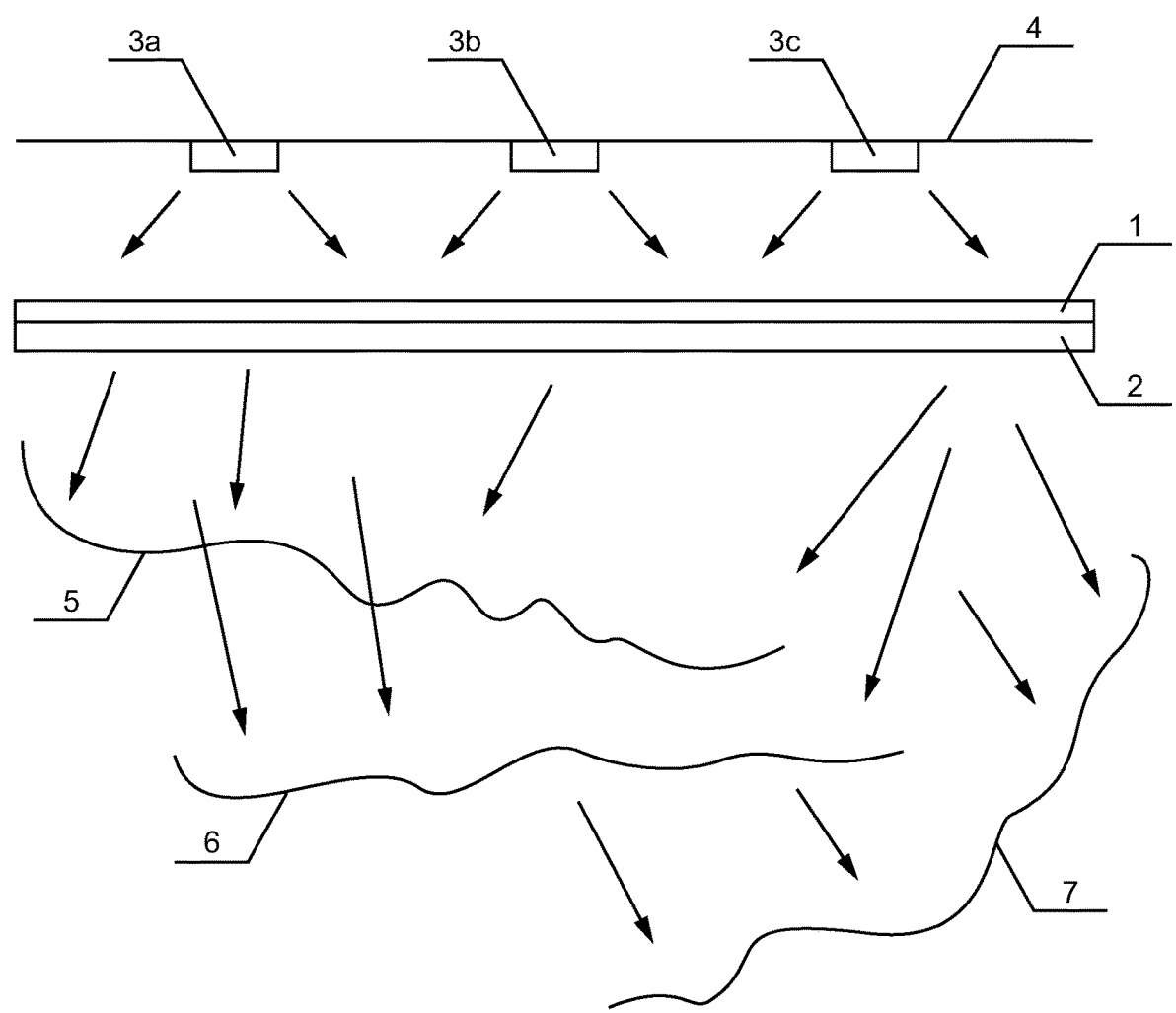
FIG. 1 is a schematic explanatory view of an optical arrangement comprising a display panel in combination with a series of light sources, in accordance with a first embodiment of the invention.

Referring firstly to FIG. 1, here there is shown a first embodiment optical arrangement, in which:
  1=the cryptographic display panel, comprising an optical material layer containing a holographic encoded record of an image to be reconstructed and displayed by the panel,
  2=a transparent display carrier (e.g. a carrier layer or substrate), for carrying the optical material layer of the panel 1,
  3*a*, 3*b*, 3*c*=point light sources (e.g. LEDs),
  4=light sources' carrier board,
  5=the light wave focusing the image displayed by the illumination of the display panel 1 by the light source 3*a*,
  6=the light wave focusing the image displayed by the illumination of the display panel 1 by the light source 3*b*,
  7=the light wave focusing the image displayed by the illumination of the display panel 1 by the light source 3*c*.

It is to be noted that, in this example embodiment, when the plural light sources 3*a*, 3*b*, 3*c* are illuminating the display panel in a parallel configuration, the respective images represented by the light waves 5, 6 and 7 will each be displayed as a discrete image. Furthermore, for example, under the simultaneous illumination of the LEDs 3*a* and 3*b*, the images 5 and 6 will be visible simultaneously.

Figure 2:
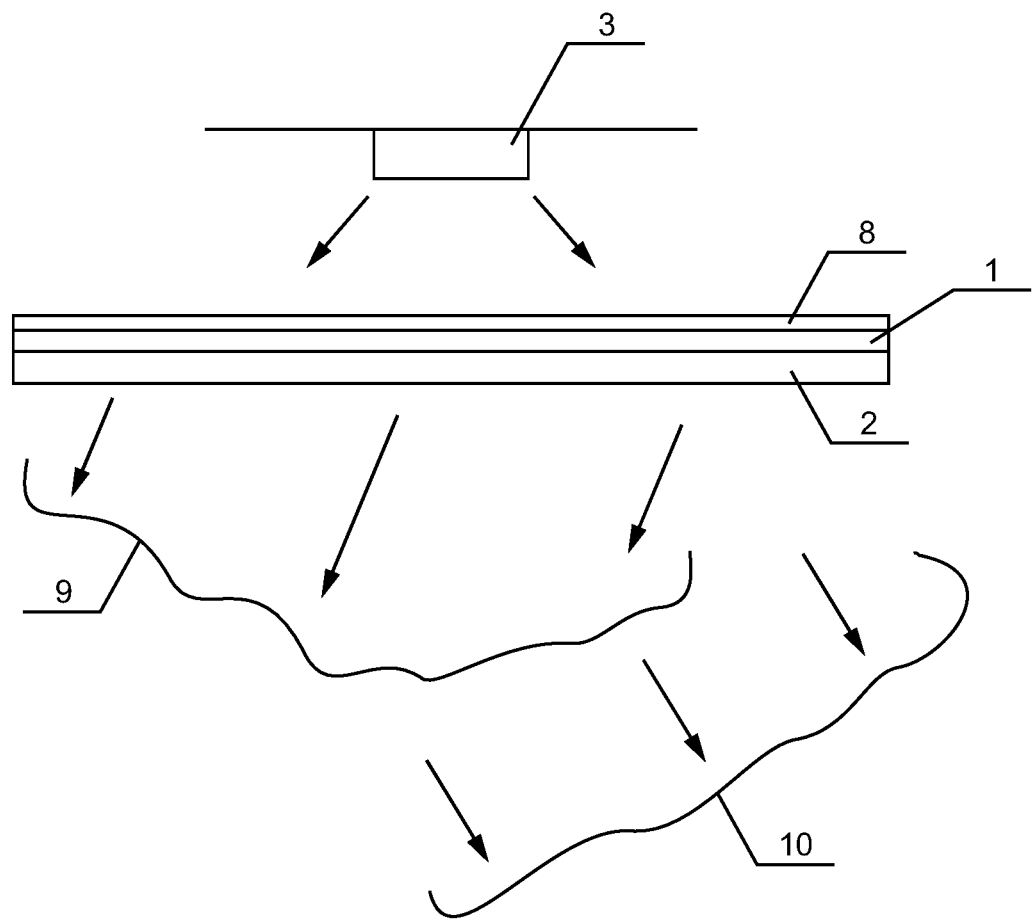
FIG. 2 is a schematic explanatory view of another optical arrangement comprising another form of display panel in combination with a light source, in accordance with a second embodiment of the invention.

FIG. 2 shows a second embodiment optical arrangement, in which:
  1=cryptographic display panel, comprising an optical material layer containing a holographic encoded record of an image to be reconstructed and displayed by the panel,
  2=transparent display carrier (e.g. a carrier layer or substrate), for carrying the optical material layer of the panel 1,
  3=a point light source (e.g. an LED),
  8=light polarization changing layer (e.g. a polarizing filter layer),
  9=the light wave focusing the image displayed by the illumination of the display panel 1 by the light source 3 and at a defined polarization given by the polarizing layer (or filter) 8,
  10=the light wave focusing the image displayed by the illumination of the display panel 1 by the light source 3 and when the polarization is changed by the polarizing layer (or filter) 8.

Figure 3:
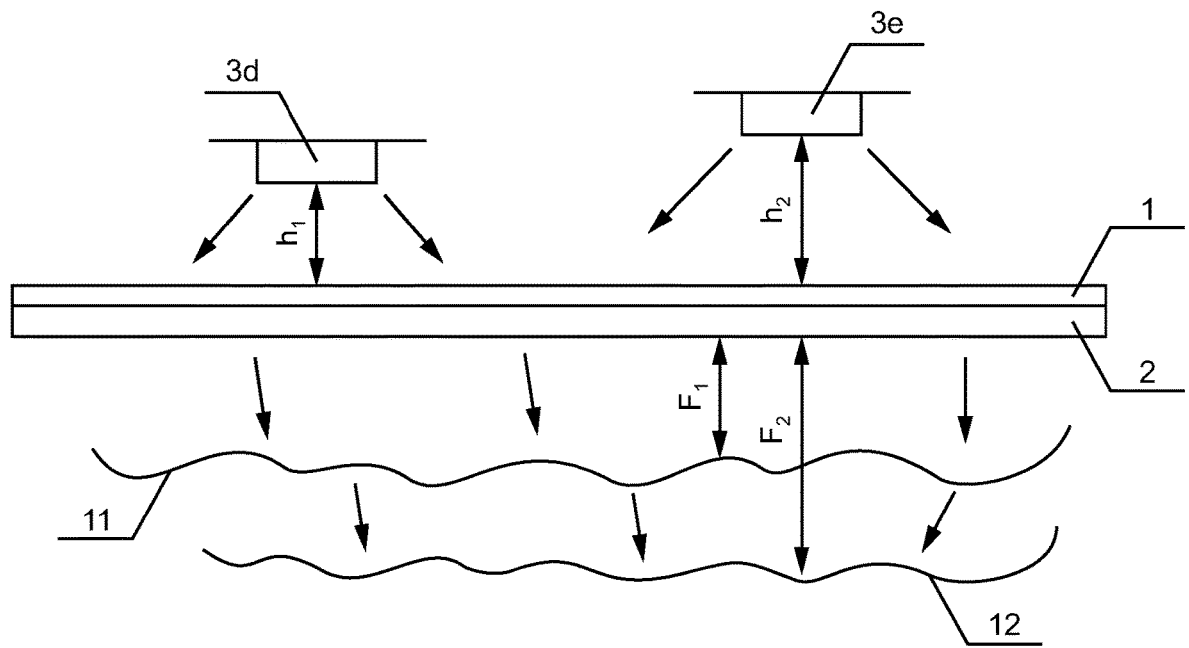
FIG. 3 is a schematic explanatory view of another optical arrangement comprising another form of display panel in combination with a different series of light sources, in accordance with a third embodiment of the invention.

FIG. 3 shows a third embodiment optical arrangement, in which:
  1=cryptographic display panel, comprising an optical material layer containing a holographic encoded record of an image to be reconstructed and displayed by the panel,
  2=transparent display carrier (e.g. a carrier layer or substrate), for carrying the optical material layer of the panel 1,
  3*d*, 3*e*=point light sources (e.g. LEDs) at distances h1 and h2 from the cryptographic display panel 1, 11=the light wave focusing the image displayed by the illumination of the display panel 1 by the light source 3*d* (this image being displayed in space at a distance F1 from the cryptographic display panel 1), 12=the light wave focusing the image displayed by the illumination of the display panel 1 by the light source 3*e* (this image being displayed in space at a distance F2 from the cryptographic display panel 1).

It is to be noted that, in this example embodiment, the change in the position of the image in space from F1 to F2 is due to the position of the light source changing from position h1 to position h2.

Figure 4:
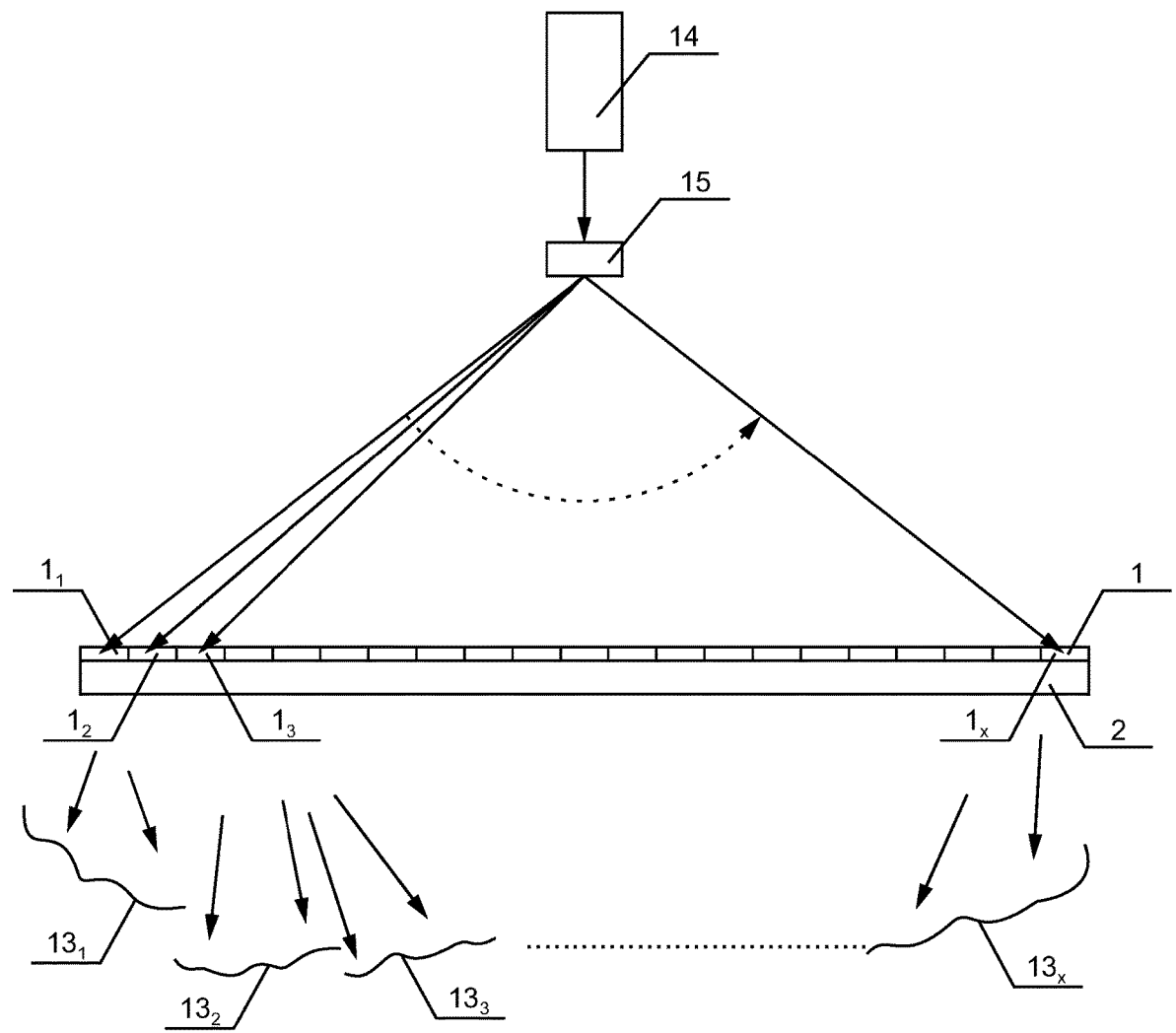
FIG. 4 is a schematic explanatory view of another optical arrangement comprising another form of display panel in combination with a light source, in accordance with a fourth embodiment of the invention.

FIG. 4 shows a fourth embodiment optical arrangement, in which:

1=cryptographic display panel (as in other embodiments above), split into x sub-areas designated $1_1$, $1_2$, $1_3$, etc. . . . up to $1_x$.

2=transparent display carrier (as in other embodiments above),

14=a point light source (e.g. a laser),

15=a scanning device scanning the laser light beam through the display panel sub-areas $1_1$ to $1_x$, $13_1$ to $13_x$=the light waves focusing the images displayed by the illumination of the display panel 1 from each of the sub-areas $1_1$ to $1_x$.

It is to be noted that, in this example embodiment, by scanning the display panel sub-areas $1_1$ to $1_x$ one can generate "kinetic" images (e.g. movies). The scanner 15 may, if desired or appropriate, be equipped with a shutter in order to be able to generate more complex movie-type kinetic images not repeating the same images.

Figure 5:
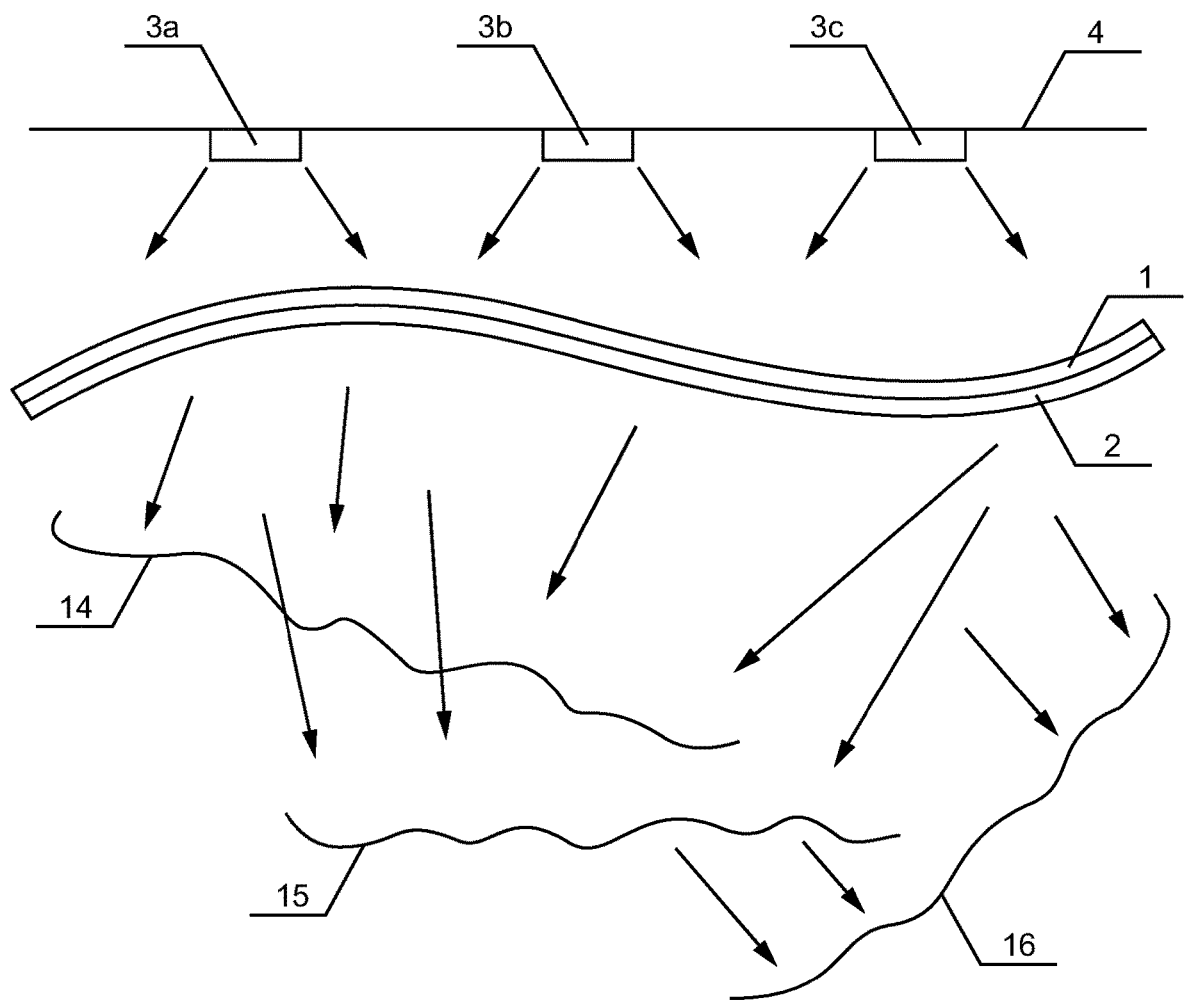
FIG. 5 is a schematic explanatory view of another optical arrangement comprising another, non-planar form of display panel in combination with another, different series of light sources, in accordance with a fifth embodiment of the invention.

FIG. 5 shows a fifth embodiment optical arrangement, in which:

1=cryptographic display panel, comprising an optical material layer containing a holographic encoded record of an image to be reconstructed and displayed by the panel, but which in this embodiment is configured into a curved or wavy shape (and which may itself be flexible), 2=transparent display carrier (e.g. a carrier layer or substrate), for carrying the optical material layer of the panel 1, which is of a flexible material and formed into a curved or wavy shape,

3*a*, 3*b*, 3*c*=point light sources (e.g. LEDs),

4=light sources' carrier board,

14=the light wave focusing the image displayed by the illumination of the display panel 1 by the light source 3*a*, 15=the light wave focusing the image displayed by the illumination of the display panel 1 by the light source 3*b*, 16=the light wave focusing the image displayed by the illumination of the display panel 1 by the light source 3*c*.

Figure 6:
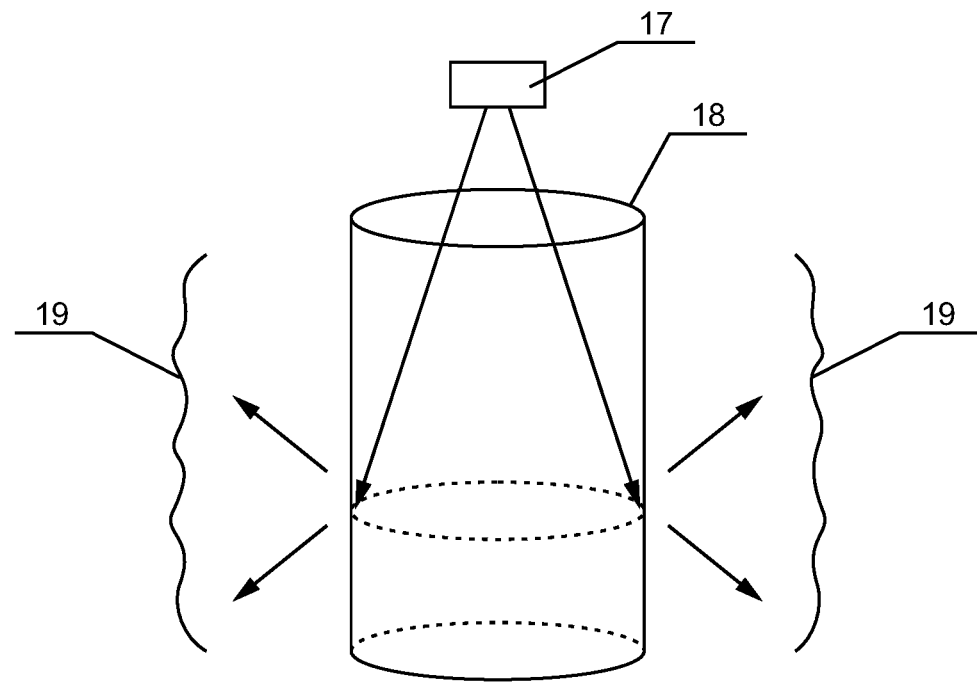
FIG. 6 is a schematic explanatory view of another optical arrangement comprising a curved form of display panel in combination with a light source, in accordance with a sixth embodiment of the invention.

FIG. 6 shows a sixth embodiment optical arrangement, in which:

17=a light source illuminating a curved (e.g. cylindrically configured) cryptographic display panel 18, 18=curved (e.g. cylindrically configured) cryptographic display panel (of a corresponding basic structure as in other embodiments above), 19=the light wave focusing the image displayed by the illumination of the cylindrical cryptographic display panel 18.

It is to be noted that, in this example embodiment, the image displayed by the cylindrical cryptographic display panel 18 is visible at every angle around it as defined by the overall curved shape of the display panel 18. Thus, in the illustrated example embodiment, a cylindrical/circular display panel 18 generates an image 19 visible at any position from 0° to 360° thereabout.

Figure 7:
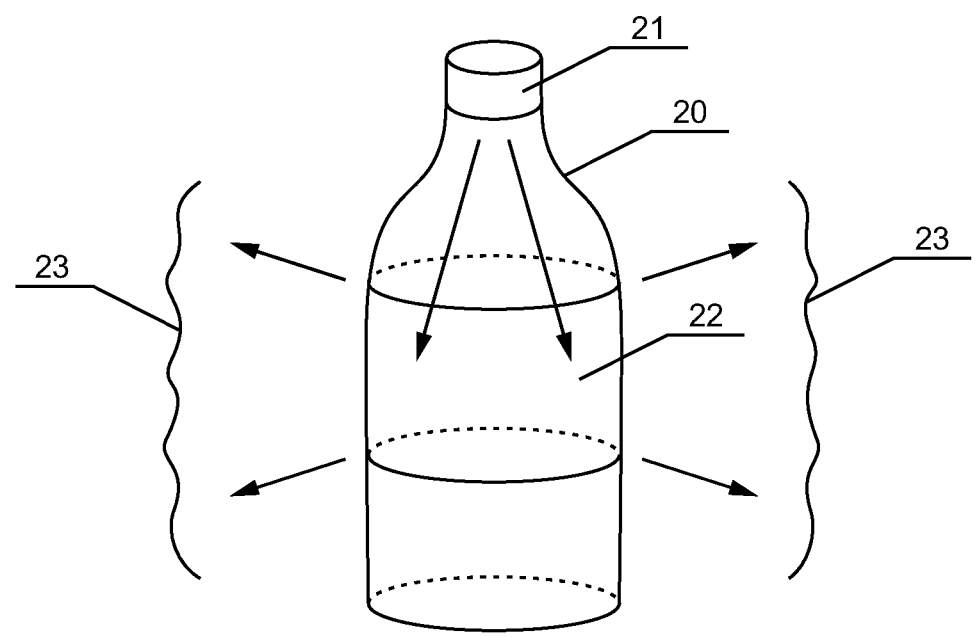
FIG. 7 is a schematic explanatory view of an example of an optical arrangement comprising another curved form of display panel applied for example to a bottle, in combination with a light source that is incorporated into the cap of the bottle, in accordance with a seventh embodiment of the invention.

FIG. 7 shows a seventh embodiment optical arrangement, in which a cylindrical form of cryptographic display panel of the embodiment shown in FIG. 6 is carried on or affixed to (or even incorporated into the wall material of) e.g. a bottle (as just one example of another object which may have a display panel of an embodiment of the invention incorporated or combined or applied to/with it). As shown in FIG. 7:

20=body of the bottle (e.g. of a transparent material),

21=cap of the bottle, which has integrated into it a light source (e.g. an LED) which illuminates the cylindrical cryptographic display panel 22 affixed to the body of the bottle 20, 22=cryptographic display panel (cylindrical, and of a corresponding basic structure as in other embodiments above), 23=the light wave focusing the image displayed by the illumination of the cylindrical cryptographic display panel 22.

It is to be noted that, in this example embodiment, the image displayed by the cryptographic display panel 22 is visible at any position from 0° to 360° around the bottle.

Throughout the description and claims of this specification, the words "comprise" and "contain" and linguistic variations of those words, for example "comprising" and "comprises", mean "including but not limited to", and are not intended to (and do not) exclude other moieties, additives, components, elements, integers or steps.

Throughout the description and claims of this specification, the singular encompasses the plural unless expressly stated otherwise or the context otherwise requires. In particular, where the indefinite article is used, the specification is to be understood as contemplating plurality as well as singularity, unless expressly stated otherwise or the context requires otherwise.

Throughout the description and claims of this specification, features, components, elements, integers, characteristics, properties, compounds, chemical moieties or groups described in conjunction with a particular aspect, embodiment or example of the invention are to be understood to be applicable to any other aspect, embodiment or example described herein unless incompatible therewith or expressly stated otherwise.

The invention claimed is:

1. A display panel comprising a body of optical material, the body having at least one optical image recorded therein in an encoded manner, wherein the image is selectively reconstructable and viewable by illuminating the panel using at least one light source only under predefined illumination conditions, wherein the encoded recording of the at least one image and the predefined illumination conditions only under which the image is selectively reconstructable and viewable are by virtue of the image is selectively reconstructable and viewable such that at least one first optical property or parameter of the reconstructed image being selectable in value from amongst variable values of the at least one first optical property or parameter, or whose value is actively modifiable over time, as a function of or in dependence on the value of at least one second optical property or parameter of the illumination conditions of the at least one light source which is selectable from amongst variable values thereof or which is actively modifiable in value over time;

wherein the first optical property or parameter of the or each reconstructable image is selectable from optical properties or parameters of the or each image when reconstructed being any of the following (either singly or in any combination of two or more):
  (a)(i) a geometry, or visual shape or configuration, or other appearance, of the or each image;
  (a)(ii) in a case of plural images, a geometry, or visual shape or configuration, or other appearance, of the plural images when reconstructed and viewed collectively;
  (a)(iii) a position of the or each image in space;
  (a)(iv) a position in space (optionally the position of one or more focal/image planes) at which the or each image is reconstructable and/or is viewable;
  (a)(v) in a case of plural images, a relative spatial separation or displacement, relative to one another, of the plural images, optionally whether appearing in different spaced-apart planes or other locations in space;
  (a)(vi) a colour of (i.e., the wavelength or frequency of the light that forms) the or each image;
  (a)(vii) a polarisation (e.g., directional or phase) of light that forms the or each image;
  (a)(viii) a temporal dynamic nature or appearance or configuration of the or each image, optionally whether it is substantially static or whether the, or at least one of plural, image(s) changes with, or is animated over a period of, time; and wherein the second optical property or parameter of the illumination conditions of, or provided or generated by, the at least one light source, which is selectable from amongst variable values thereof or which is actively modifiable in value over time, is selectable from optical properties or parameters of the at least one light source being any of the following (either singly or in any combination of two or more):
  (b)(i) a position of the at least one, or each, light source, optionally its position relative to, or its spacing from, the display panel;
  (b)(ii) in the case of plural light sources, relative positions in space of the plural light sources, relative to each other and/or relative to the display panel, optionally the relative positions (with respect to each other and/or to the display panel) of plural such light sources either within a given plane in space or as between different planes in space that are spaced apart from one another;
  (b)(iii) an angle of incidence of one or more rays (or waves) of light emanating from the or each light source on the display panel as it/they interact(s) therewith;
  (b)(iv) a colour of the or each light source, i.e., the wavelength or frequency of the light that emanates from each light source and illuminates the display panel;
  (b)(v) a brightness or optical intensity of the light that emanates from the or each light source;
  (b)(vi) a polarisation (e.g., directional or phase) of the light that emanates from the or each light source;
  (b)(vii) a direction in space (optionally the direction relative to the display panel) of light rays that emanate from the or each light source, which direction is either substantially fixed and non-variable as a function of time, or varies as a function of time (optionally of the nature of directional scanning by the or each light source);
  (b)(viii) in the case of plural light sources, relative respective directions and relative respective angles of incidence and/or brightnesses/optical intensities and/or colours and/or polarisations of light rays that emanate from respective ones of the plurality of light sources, optionally in terms of the degree and/or speed by which such optical properties/parameters vary quantitatively or qualitatively as between different ones of the light sources as a collective array, series or group thereof (optionally the degree and/or speed by which a scanning operation is effected, as shared collectively between different ones of the plural light sources); and further wherein one or more of the second optical property(ies) or parameter(s) of the illumination conditions of (or provided or generated by) the one or more light sources is selectively adoptable, controllable or variable such that it/they dictate(s), govern(s) or lead(s) to a corresponding adoption or control of, or variation in or other functional relationship with, or dependence on, one or more respective one(s) of the one or more first optical property(ies) or parameter(s) of the or each optical image when reconstructed from the encoded record thereof in the display panel.

2. A display panel according to claim 1, wherein the at least one optical image that is recorded in an encoded manner in the panel comprises at least one three-dimensional optical image.

3. A display panel according to claim 1, wherein:
  either (i) there is a single optical image, optionally a single 3D optical image, recorded in an encoded manner in the panel and reconstructable therefrom; or
  (ii) there are a plurality of optical images, optionally a plurality of 3D optical images recorded in an encoded manner in the panel and reconstructable therefrom,
  optionally wherein, in the case of a plurality of such images, the individual images of the plurality are either coincident or superimposed over one another when reconstructed, or are separated or spaced from one another in space when reconstructed, further optionally in different spaced-apart planes in space.

4. A display panel according to claim 1, wherein any one or more of the at least one optical image(s) reconstructable from the display panel is/are located, or appear to a viewer/observer to be located, either:
  (i) substantially or at least partially within the body of optical material of the display panel, or
  (ii) substantially or at least partially outside, optionally to a side in front of or behind, the body of optical material of the display panel.

5. A display panel according to claim 1, wherein:
  either (a) one or more of the first optical properties or parameters of the or each reconstructable image is/are definable quantitatively, and is/are selectable so as to have a particular defined or specified value, whereby the or the respective reconstructable image comprises a unique or single or static such image; or
  (b) one or more of the first optical properties or parameters of the or each reconstructable image is/are definable so as to be variable quantitatively or qualitatively, and is/are selectable so as to vary—and means are provided to cause it, or its value, to vary with or over time, whereby the or the respective reconstructable image comprises a varying or moving or animated such image or an image whose visual appearance varies in one or more other ways (apart from its position or shape or configuration).

6. A display panel according to claim 1, wherein:
either (a) one or more of the second optical properties or parameters of the illumination conditions of (or provided or generated by) the one or more light sources is/are definable quantitatively, and is/are selectable so as to have a particular defined or specified value, whereby the or the respective illumination conditions of (or provided or generated by) the or each respective light source comprises a unique or single or non-varying such illumination condition; or
(b) one or more of the second optical properties or parameters of the illumination conditions of (or provided or generated by) the one or more light sources is/are definable so as to be variable quantitatively or qualitatively, and is/are selectable so as to vary—and means are provided to cause it, or its value, to vary—with or over time, whereby the or the respective illumination conditions of (or provided or generated by) the or each respective light source comprises a varying or dynamic or scanning, or otherwise non-static or non-constant, such illumination condition.

7. A display panel according to claim 1, wherein one or more of the second optical properties or parameters of the illumination conditions of (or provided or generated by) the one or more light sources is/are selectable from amongst variable values thereof or is/are actively modifiable or variable over time, and the said one or more second optical properties or parameters of the illumination conditions is/are provided or defined not only as a feature of the one or more light sources itself/themselves, but additionally are provided or defined by a feature being or comprising one or more auxiliary optical components or auxiliary optical structures other than the one or more light sources itself/themselves, optionally one or more such auxiliary optical components or auxiliary optical structures provided or located on the display panel itself and which contributes to the overall illumination conditions of the body of optical material of the panel in or on which is recorded the one or more image(s).

8. A display panel according to claim 1, wherein the panel is in the form of a substantially flat or planar plate, film, foil, strip or layer, optionally one that is relatively thin in comparison with its flat surface area.

9. A display panel according to claim 1, wherein the panel is in the form of a relatively thin plate, film, foil, strip or layer, and is curved or arcuate or otherwise non-planar in shape/configuration.

10. A display panel according to claim 1, wherein either:
(i) the optical material in which the one or more optical image(s) is/are recorded in encoded form forms substantially the whole thickness or whole volume of the panel itself, whereby the one or more optical image(s) is/are recorded in encoded form within the body or volume of the display panel itself; or
(ii) the optical material in which the one or more optical image(s) is/are recorded in encoded form is provided as one or more discrete layers applied to one or more surfaces or faces of a carrier material or carrier layer, optionally an optically non-active or transparent carrier material that does not substantially affect or detract from the optical properties of the optical material in which is recorded the one or more image(s).

11. A display panel according to claim 1, which is of a transmission type, in which the recorded encoded optical image(s) is/are reconstructable by virtue of the light from the at least one light source passing through the display panel,
optionally further wherein the display panel is substantially transparent and optically inactive to light other than that emanating from the at least one light source.

12. A display panel according to claim 1, which is of a reflection type, in which the recorded encoded optical image(s) is/are reconstructable by virtue of the light from the at least one light source being reflected from the display panel.

13. A display panel according to claim 1, wherein the one or more optical images recorded in the body of optical material of the display panel is/are recorded therein in the form of a hologram.

14. An optical arrangement for the reconstruction and viewing of at least one optical image, the arrangement comprising:
a display panel according to claim 1; and
at least one light source;
optionally wherein the light that emanates from the at least one light source for the purpose of reconstructing the at least one optical image from the display panel is light within the visible region of the electromagnetic spectrum.

15. An optical arrangement according to claim 14, wherein the at least one light source used to reconstruct the one or more optical image(s) from the display panel comprise(s) one or more point light sources, optionally one or more light sources selected from one or more LEDs, lasers, fibre-optic devices or waveguide-based light sources.

16. An optical arrangement according to claim 14, wherein the arrangement further comprises a scanning device for varying the illumination conditions, or the position or location or distribution of the illuminating light, on the panel by the at least one light source in a scanning or cycling manner.

17. An optical arrangement according to claim 14, wherein the arrangement further comprises means for varying the brightness or optical intensity, or the polarisation, or the direction of ray propagation, of light emanating from the at least one light source and impinging on the panel.

18. An optical arrangement according to claim 14, wherein the at least one optical image is reconstructable and thereby viewable by a viewer or observer with the naked eye(s), without the need or use or aid of an auxiliary viewing device.

19. A method of forming or reconstructing at least one optical image, optionally at least one three-dimensional optical image, from a display panel using at least one light source, wherein the display panel is a display panel according to claim 1, the method comprising:
providing an optical arrangement comprising the said display panel and the said at least one light source;
selecting the value of the at least one second optical property or parameter of the illumination conditions of the at least one light source from amongst the variable values thereof, or actively modifying the value of the said second optical property or parameter over time, and
illuminating the display panel using the so selected or actively modified at least one light source,
whereby the image is selectively reconstructable and viewable by the said illumination of the panel only using the so selected or actively modified at least one second optical property or parameter of the at least one light source, and whereby the at least one first optical property or parameter of the reconstructed image is selected in value from amongst variable values thereof, or whose value is actively modified over time, as a function of or in dependence on the said selected value of the at least one second optical property or parameter of the at least one light source, or as a function of or in dependence on the actively modified at least one second optical property or parameter of the at least one light source.

* * * * *